(No Model.)

C. P. HIGGINS.
HAND HOLE PLATE.

No. 358,394. Patented Feb. 22, 1887.

WITNESSES.
Aug Creveling
M. R. Jones

INVENTOR.
Campbell P. Higgins
by Chas. N. Forbes
ATTORNEY.

UNITED STATES PATENT OFFICE.

CAMPBELL P. HIGGINS, OF PHILADELPHIA, PENNSYLVANIA.

HAND-HOLE PLATE.

SPECIFICATION forming part of Letters Patent No. 358,394, dated February 22, 1887.

Application filed June 18, 1886. Serial No. 205,528. (No model.)

*To all whom it may concern:*

Be it known that I, CAMPBELL P. HIGGINS, a citizen of the United States, residing at Philadelphia, Pennsylvania, have invented a certain new and useful Improvement in Hand-Hole Plates, of which the following is a specification, reference being had to the accompanying drawings, forming a part thereof, in which—

Figure 1:
Figure 2:
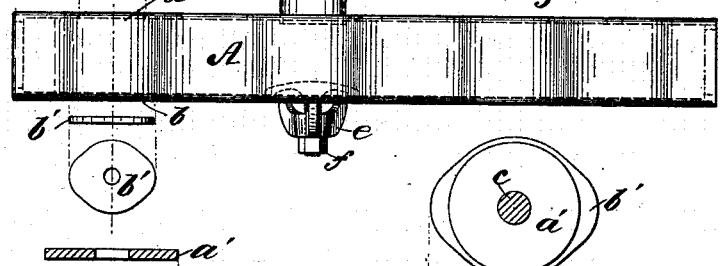

Figure 1 is a front elevation, Fig. 2 a plan view, and Figs. 3 to 7, inclusive, detail views, illustrating an application of my invention to the header of a sectional steam-boiler.

This invention relates to hand-hole plates for use in any vessel of malleable-iron boiler-plate in which pressure is contained and a tight joint is required; and the object of my improvement is to utilize in the manufacture of the same the plate-scrap, otherwise wasted, which is punched from the boiler-plate in the operation of forming the hand-holes and tube-holes.

In order that others may understand and use my invention I will proceed to describe the method of its production, and set forth in the appended claims the novel features of said article.

Figs. 1 and 2 in the drawings represent a wrought-iron header in which a series of circular holes, $a$, are punched on the one side for the reception of boiler-tubes, and a series of oblong holes, $b$, are punched on the opposite side thereof, corresponding in position with the tube-holes, to afford access thereto.

Figure 3:
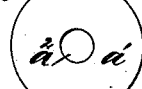
Figure 4:
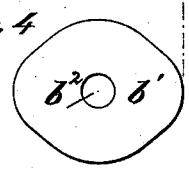
Figure 5:
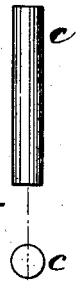
Figure 6:
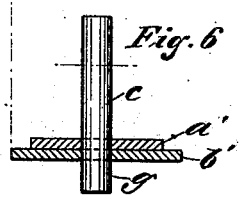
Figure 7:
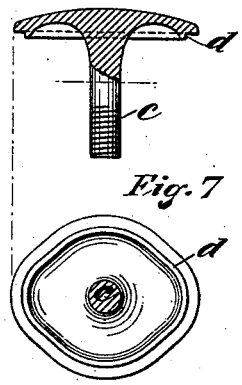

The plate-scrap $a$ of circular form and $b$ of oblong form thus punched from boiler-plate, and shown detached in Fig. 2 and enlarged in Figs. 3 and 4, are punched at their centers with holes $a\ b$ prior to or during or succeeding their production from the header A, said holes $a\ b$ being of such size as to closely fit a bolt, $c$, Fig. 5.

The integral hand-hole plate having a shank (shown in sectional and inverted plan views, Fig. 7) is produced from the several pieces in the following manner: The plates $a\ b$ are placed one upon the other in the position shown in Fig. 6 and the bolt $c$ driven in. The bolt $c$ may be of sufficient length to extend through the plates, as shown at $g$, in cases where the required stock is lacking in the plates, the same being upset when forged. The whole is now heated to forging-heat and placed in the dies of a drop-forging machine, which welds the several parts into a homogeneous mass, the said dies having a form which imparts the shape illustrated in Fig. 7, in which the plates have expanded diametrically, so as to form the overlapping shoulder $d$, having a counter-rim which exactly fits the oblong hand-hole $b$ in the header A. The shank $c$ is screw-threaded by subsequent operation to receive a nut, $f$, Figs. 1 and 2, which, with the yoke $e$, secures the plate in position on its seat within the header. The oblong holes $b$, which are so formed in order to permit the insertion of the hand-hole plate, have portions of their edges cut straight in this instance, as will be observed in the several views, for the purpose of leaving as much stock of metal as possible between the said holes when cut in the relative position shown in the corrugated header, Fig. 1.

The guard or yoke $e$ is constructed with two of its arms arranged at such an angle as to bear directly upon the center line of the header, as shown in Fig. 1, wherein this instance the header is most likely to yield when under internal pressure, and by such arrangement said guard or yoke acts to resist such effect of the pressure.

I claim as my invention—

1. A solid wrought hand-hole plate and bolt, composed of the bolt and the scrap removed to form the hand and tube orifices, as set forth.

2. A guard or yoke for securing a hand-hole plate having arms arranged to bear upon such portion of the surface most likely to yield under internal pressure, as set forth.

CAMPBELL P. HIGGINS.

Witnesses:
CHAS. W. FORBES,
AUG. CREVELING.